(12) United States Patent
Salib et al.

(10) Patent No.: US 7,141,843 B2
(45) Date of Patent: Nov. 28, 2006

(54) INTEGRATABLE POLARIZATION ROTATOR

(75) Inventors: Michael S. Salib, Campbell, CA (US);
Dmitri Nikonov, Morgan Hill, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/963,313

(22) Filed: Oct. 11, 2004

(65) Prior Publication Data

US 2006/0076592 A1    Apr. 13, 2006

(51) Int. Cl.
*H01L 31/113* (2006.01)

(52) U.S. Cl. ............. 257/295; 257/421; 257/422; 257/423; 257/425; 257/427

(58) Field of Classification Search ......... 257/33, 257/34, 421, 427, 425, 295, 422, 423, E27.104, 257/E29.164, E29.272
See application file for complete search history.

(56) References Cited

U.S. PATENT DOCUMENTS 5,416,353 A * 5/1995 Kamiguchi et al. ......... 257/421

2002/0084453 A1 * 7/2002 Bozovic ............... 257/35
2003/0016425 A1 * 1/2003 Tan et al. ............. 359/192

OTHER PUBLICATIONS

Y.D. Park et al. A Group-IV Ferromagnetic Semiconductor: MnxGe1-x, Science, vol. 295, Jan. 2002, pp. 651-654.
J.M. Kikkawa et al. "Resonant Spin Amplification in n-Type GaAs", The American Physical Society, Physical Review Letters, vol. 80, No. 19, May 1998, pp. 4313-4316.
K. Brunner et al. Fabrication and Band Alignment of Pseudomorphic Si1-y Cy, Si1-x-yGexCy and Coupled Si 1-yCy/Si1-z-yG3xCy Quantum Well Structures on Si Substrates, Journal of Crystal Growth, 175/176 (1997) 451-458.

* cited by examiner

*Primary Examiner*—Nathan J. Flynn
*Assistant Examiner*—Tan Tran
(74) *Attorney, Agent, or Firm*—Michael D. Plimier

(57) ABSTRACT

Embodiments of the invention provide a polarization rotator. The polarization rotator may be integrated with a waveguide on a substrate, and may include a ferromagnetic semiconductor layer on the substrate, a first doped layer on the ferromagnetic semiconductor layer, and a second doped layer on the first doped layer.

11 Claims, 10 Drawing Sheets

INTEGRATABLE POLARIZATION ROTATOR

BACKGROUND

Background of the Invention

FIG. 1 is a schematic diagram illustrating an optical communications system 100 that converts an electrical signal 102 carried by a conductor such as a metal wire to an optical signal 108 carried by a transmissive medium such as a glass fiber. An optical source 104, such as a laser, may receive the electrical signal 102 and produce and convert it to an optical signal 108. The optical signal 108 may be carried by a transmissive medium such as an optical fiber to a destination, or may be transmitted through air or a vacuum. An isolator 106 may be used to prevent back reflections. Back reflections may disturb the operation of a laser and prevent normal operation of an optical system. The isolator 106 may include a polarization rotator.

DETAILED DESCRIPTION

In various embodiments, an apparatus and method relating to the formation of a device integrated in a substrate are described. In the following description, various embodiments will be described. However, one skilled in the relevant art will recognize that the various embodiments may be practiced without one or more of the specific details, or with other methods, materials, or components. In other instances, well-known structures, materials, or operations are not shown or described in detail to avoid obscuring aspects of various embodiments of the invention. Similarly, for purposes of explanation, specific numbers, materials, and configurations are set forth in order to provide a thorough understanding of the invention. Nevertheless, the invention may be practiced without specific details. Furthermore, it is understood that the various embodiments shown in the figures are illustrative representations and are not necessarily drawn to scale.

Reference throughout this specification to "one embodiment" or "an embodiment" means that a particular feature, structure, material, or characteristic described in connection with the embodiment is included in at least one embodiment of the invention. Thus, the appearances of the phrases "in one embodiment" or "in an embodiment" in various places throughout this specification are not necessarily referring to the same embodiment of the invention. Furthermore, the particular features, structures, materials, or characteristics may be combined in any suitable manner in one or more embodiments. Various additional layers and/or structures may be included and/or described features may be omitted in other embodiments.

Various operations will be described as multiple discrete operations in turn, in a manner that is most helpful in understanding the invention. However, the order of description should not be construed as to imply that these operations are necessarily order dependent. In particular, these operations need not be performed in the order of presentation. Operations described may be performed in a different order than the described embodiment. Various additional operations may be performed and/or described operations may be omitted in additional embodiments.

Figure 1:
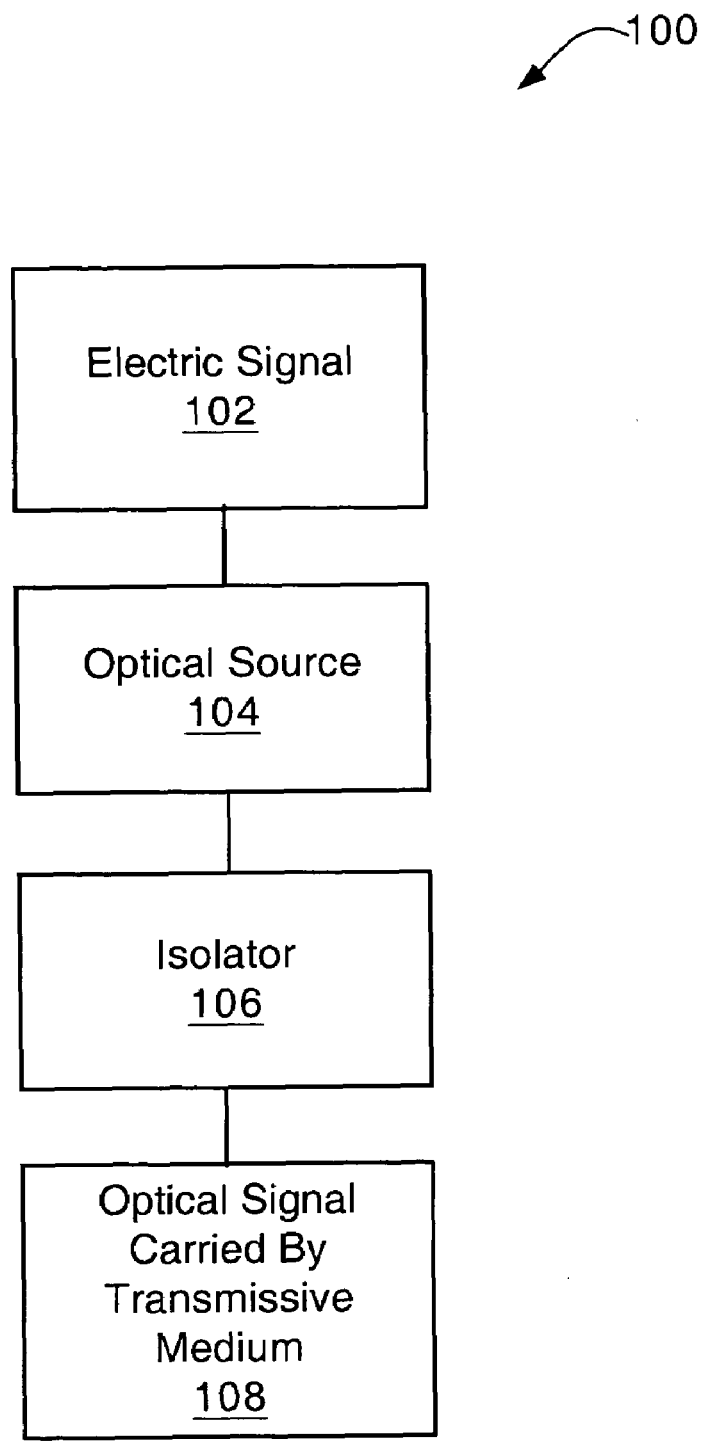
FIG. 1 is a schematic diagram illustrating an optical system.
Figure 2:
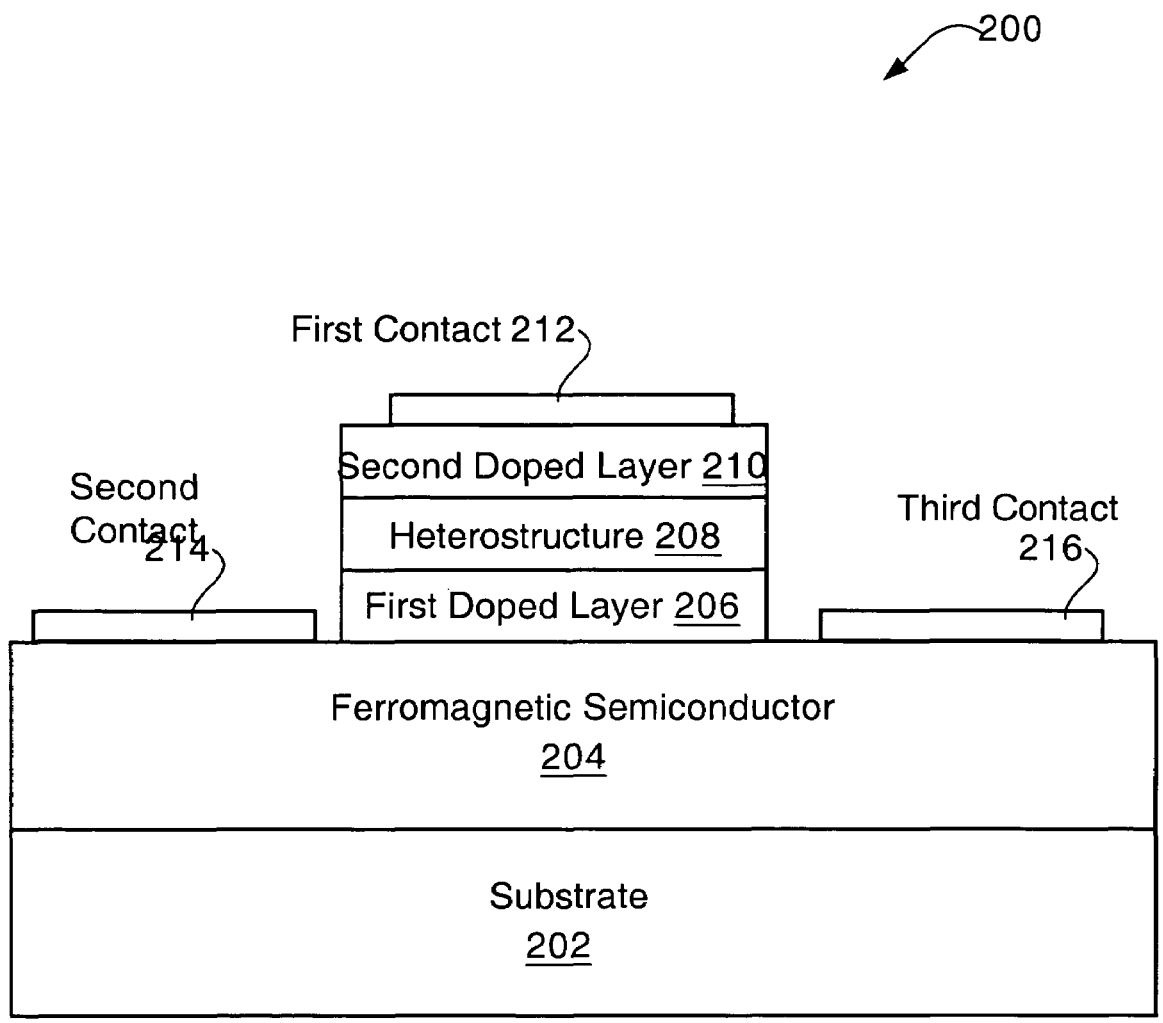
FIG. 2 is a side cross sectional view that illustrates a generalized integrated polarization rotator.

FIG. 2 is a side cross sectional view that illustrates the structure of a generalized integrated polarization rotator 200, according to one embodiment of the present invention. The polarization rotator 200 may be integrated with other passive or active devices or structures on a substrate 202, or may be a discrete device. The substrate 202 may comprise a piece of material, such as a piece of silicon or other material. The substrate 202 may be a physical structure, a layer that is a basic workpiece transformed and/or added to by various processes into the desired microelectronic configuration, or another material or materials. The substrate 202 may include conducting material, insulating material, semiconducting material, and other materials or material combinations. In some embodiments, the substrate 202 may be a multi-layered structure.

There may be a ferromagnetic semiconductor layer 204 on the substrate. The ferromagnetic semiconductor layer 204 may be a layer of semiconducting material that becomes magnetized in the presence of a magnetic field and retains its magnetism even when the field is removed. In a first embodiment, the ferromagnetic semiconductor layer 204 may comprise manganese, silicon, and germanium. In a second embodiment, the ferromagnetic semiconductor layer 204 may comprise manganese, gallium, and arsenic. In other embodiments, the ferromagnetic semiconductor layer 204 may comprise other materials.

There may be a first doped semiconductor layer 206 on the ferromagnetic semiconductor layer 204. In the first embodiment, the first doped layer 206 may comprise silicon and germanium. In the second embodiment, the first doped layer 206 may comprise aluminum, gallium and arsenic. In other embodiments, the first doped layer 206 may comprise other materials. The first doped layer 206 may be doped to a polarity compatible with the ferromagnetic semiconductor layer 204. For example, in an embodiment where the ferromagnetic semiconductor layer 204 comprises manganese, gallium, and arsenic, or silicon and germanium, the first doped layer 206 may be p-doped. In other embodiments, the first doped layer 206 may be n-doped.

There may be a heterostructure 208 on the first doped layer 206. The heterostructure 208 may comprise a plurality of alternating thin layers of materials: a layer comprising a first material or set of materials alternating with a layer comprising a second material or set of materials. The layering forms one or more heterojunctions. Thus, the heterostructure 208 may form a quantum well or other type of heterostructure 208 that may confine carriers in the vertical direction of FIG. 2. This confinement may enhance polarization of the material, which affects the light traveling in a direction perpendicular to the plane of FIG. 2 through the polarization rotator 200. (Note that the term "light" as used herein encompasses any appropriate type of electromagnetic wave.) In a first embodiment, the heterostructure 208 may comprise one or more layers comprising silicon alternating with one or more layers comprising silicon and germanium. In a second embodiment, the heterostructure 208 may comprise one or more layers comprising gallium and arsenic alternating with one or more layers comprising aluminum, oxygen, gallium, and arsenic. In other embodiments, the alternating layers may comprise other materials.

There may be a second doped layer 210 on the heterostructure 208. In a first embodiment, the second doped layer 210 may comprise silicon. In a second embodiment, the second doped layer 210 may comprise aluminum, gallium and arsenic. In other embodiments, the second doped layer 210 may comprise other materials. The second doped layer 210 may be doped to a polarity opposite that of the first doped layer 206. For example, in an embodiment where the first doped layer 206 is p-doped, the second doped layer 210 may be n-doped. In an embodiment where the first doped layer 206 is n-doped, the second doped layer 210 may be p-doped. This arrangement of polarity of dopants results in a diode structure that may promote efficient injection of carriers into the polarization rotator once voltage is applied to it.

The polarization rotator 200 may include contacts 212, 214, 216. In the illustrated embodiment, the polarization rotator 200 includes a first contact 212 on the second doped layer 210, a second contact 214 adjacent to a first side of the heterostructure 208 (on the left side of the heterostructure 208 in FIG. 2), and a third contact 216 adjacent a second side of the heterostructure 208 (on the right side of the heterostructure 208 in FIG. 2). While all three contacts 212, 214, 216 are illustrated in the embodiment of FIG. 2, contacts 214 and 216 may perform a similar function. In alternate embodiments, either one of contacts 214 and 216 may be present, rather than both. These contacts 212, 214, 216 may comprise a ferromagnetic metals such as iron, cobalt, nickel, or another conductive material.

In operation, light may travel through the polarization rotator 200. The light may travel in a direction perpendicular to the plane of FIG. 2. Layers 206, 208 and 210 form a vertical structure extending perpendicular from the ferromagnetic semiconductor layer 204. This vertical structure may cause the light to be guided in the direction of its propagation. This vertical structure may also make the polarization rotator compatible with other waveguides formed in the substrate 202. A voltage may be applied between the first and second contacts 212, 214 and/or between the first and third contacts 216. For example, in an embodiment, a voltage between about 0.5 volts and about 5 volts may be applied between the first and second contacts 212, 214 and between the first and third contacts 216. This may cause injection of spin-polarized carriers, which may then rotate the polarization of the light. By varying the amount of voltage applied, the amount of polarization rotation may be varied.

In more detail, the polarization rotator 200 may exploit the interaction of light with spin-polarized electrons in a semiconductor material. One method of creating spin polarized electrons is through injecting carriers from a contact made out of a ferromagnetic material into the semiconductor material. The states of electrons in the conduction band may have the quantum states with spin=+or −½. In the valence band it may happen that quantum states for heavy holes (spin=+or −3/2) have lower energy than light holes (spin=½). Therefore the heavy-hole states may be populated rather than the light-hole states. In the presence of a magnetic field the degeneracy relative to +or − value of the spin may be lifted, resulting in a splitting of the corresponding energies: heavy holes spin=−3/2 are split from spin=+3/2, light holes=−½, are split from spin=+½. Due to the quantum mechanical selection rule Δm=+/−1 (conservation of angular momentum), only the electron −½ to hole −3/2 transition driven by right circularly polarized light (RCP) or the electron +½ to hole +3/2 transition driven by left circularly polarized light (LCP) may be allowed. When spin polarized carriers are injected into such a system, the + and − spin states may exhibit different populations. Therefore, LCP and RCP light may experience different indices of refraction. When linearly polarized light (a combination of RCP and LCP) interacts with such a system, its polarization may rotate. This phenomenon is typically called the Faraday effect.

In an embodiment, the first contact 212 may be a ferromagnetic contact that injects spin polarized electrons. One or more of the second and third contacts 214, 216 may be to the ferromagnetic semiconductor layer 204, within which the carriers may be holes. A magnetic field may be applied along the waveguiding direction (perpendicular to the plane of FIG. 2) to keep the magnetization direction of the ferromagnetic semiconductor 204. Provided the right direction of magnetization, e.g. holes with spin primarily +3/2 may be injected into the heterostructure 208. This may ensure the different indices of refraction for LCP and RCP as per the paragraph above.

FIGS. 3a through 3h are cross sectional side views that illustrate various stages in making the polarization rotator 200 of FIG. 2, according to one embodiment of the present invention.

Figure 3A:
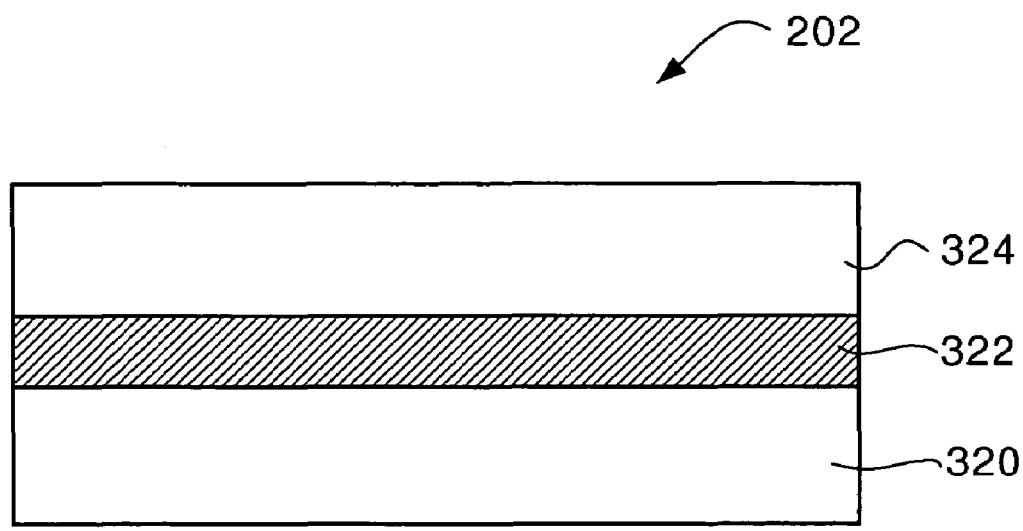
FIGS. 3a through 3h are cross sectional side views that illustrate various stages in making the polarization rotator.

FIG. 3a is a cross sectional side view that illustrates the substrate 202 according to one embodiment. In an embodiment, the substrate 202 may be a silicon on insulator (SOI) substrate 202 as illustrated, although in other embodiments, the substrate 202 may be of a different type. The substrate 202 may include a handling layer 320, an insulator layer 322 on the handling layer 320, and a device layer 324 on the insulator layer 322. In an embodiment, the handling layer 320 may comprise silicon, the insulator layer 322 may comprise silicon dioxide, and the device layer 324 may comprise silicon. In other embodiments, the substrate 202 may be a different type of buried insulator substrate compatible with the materials to be used in the layers on top of the substrate 202. For example, in the second embodiment described with respect to FIG. 2, the substrate 202 may be gallium arsenide based. In yet other embodiments, other materials may be used, and the substrate 202 may be of a type that lacks a buried insulator layer 322, such as a single layer of semiconductor material.

Figure 3B:
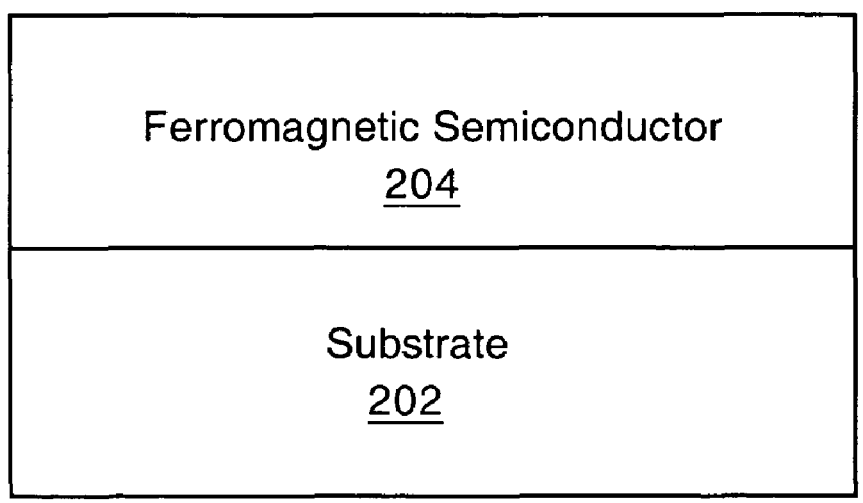

FIG. 3b is a cross sectional side view that illustrates the ferromagnetic semiconductor layer 204 formed on the substrate 202. In some embodiments, the ferromagnetic semiconductor layer 204 may comprise manganese, silicon, and germanium, or manganese, gallium, and arsenic, although in other embodiments other materials may be used. In one embodiment, the ferromagnetic semiconductor layer 204 may comprise $Mn_{0.05}Ga_{0.95}As$. In another embodiment, the ferromagnetic semiconductor layer 204 may comprise $Mn_{0.05}Si_{0.1}Ge_{0.75}$. In an embodiment, the ferromagnetic semiconductor layer 204 is formed on the substrate 202 by an atomic layer epitaxy process. In some embodiments, this process is performed at a low temperature, such as about 400 degrees Celsius, although other temperatures may be used. In some embodiments, the ferromagnetic semiconductor layer 204 may have a thickness between about 50 nanometers and about 300 nanometers. In an embodiment, the ferromagnetic semiconductor layer 204 may have a thickness between about 50 nanometers and about 150 nanometers. In other embodiments, the ferromagnetic semiconductor layer 204 may have a different thickness.

Figure 3C:
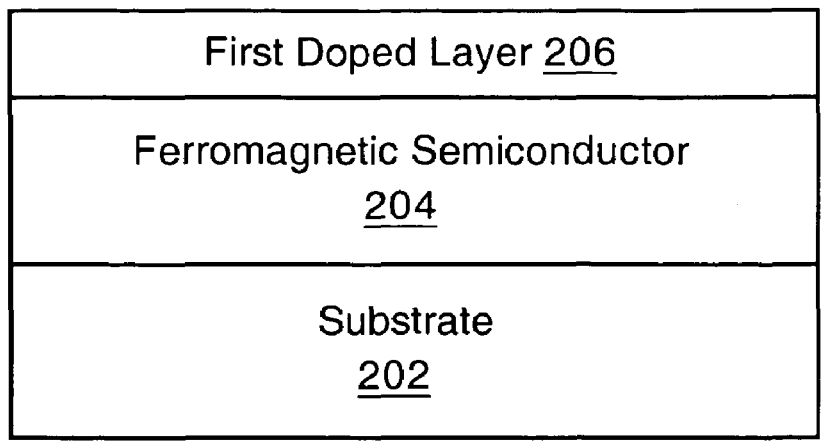

FIG. 3c is a cross sectional side view that illustrates first doped layer 206 formed on the ferromagnetic semiconductor layer 204. In some embodiments, the first doped layer 206 may have a doping type based on the conductivity type of the ferromagnetic semiconductor layer 204. In an embodiment where the ferromagnetic semiconductor layer 204 comprises MnSiGe, the first doped layer 206 may comprise SiGe. In such an embodiment, the first doped layer 206 may have p-type doping based on the p-type conductivity type of the MnSiGe ferromagnetic semiconductor layer 204. Similarly, in an embodiment where the ferromagnetic semiconductor layer 204 comprises MnGaAs, the first doped layer 206 may comprise AlGaAs, with p-type doping. In other embodiments, the first doped layer 206 may comprise different materials and be doped differently. In some embodiments, the first doped layer 206 may have a thickness between about 50 nanometers and about 300 nanometers. In an embodiment, the first doped layer 206 may have a thickness between about 50 nanometers and about 150 nanometers. In an embodiment, the first doped layer 206 may have a thickness between about 50 nanometers and about 100 nanometers. In other embodiments, the first doped layer 206 may have a different thickness.

Figure 3D:
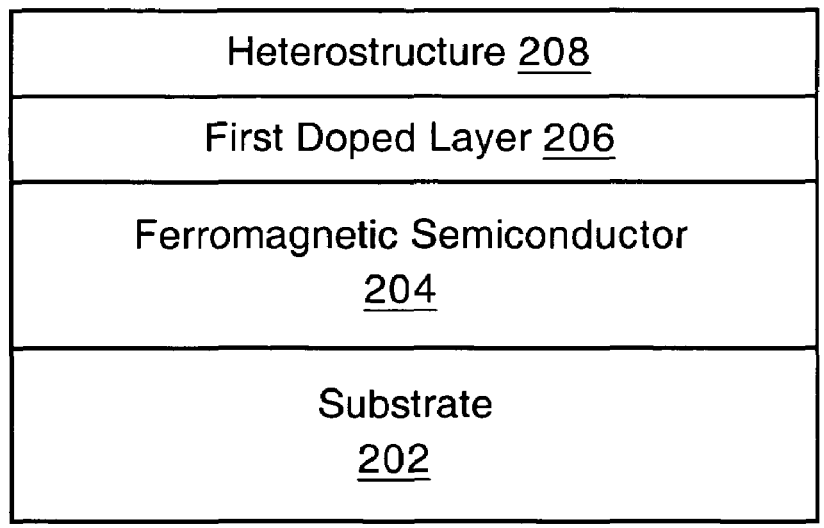
Figure 3E:
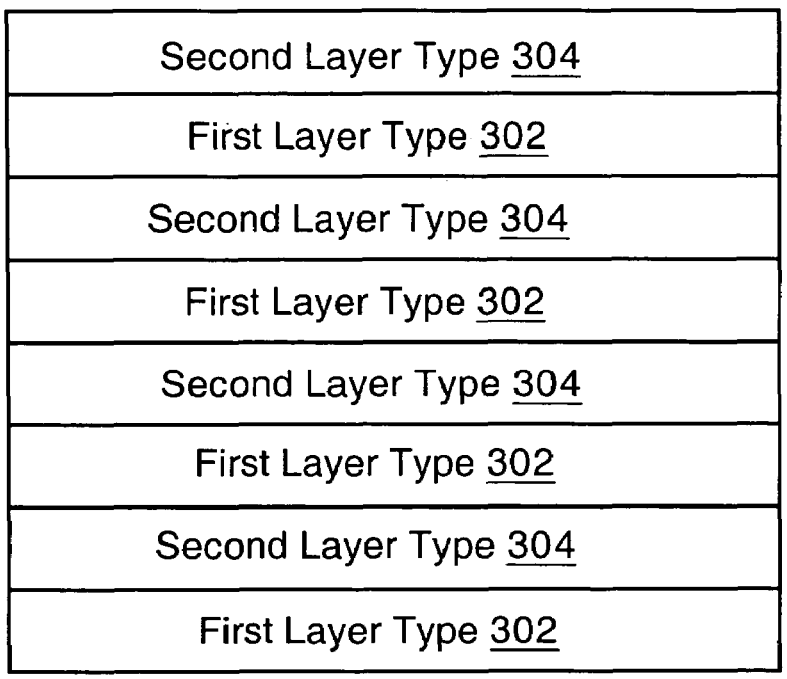

FIG. 3d is a cross sectional side view that illustrates the heterostructure 208 formed on the first doped layer 206, according to one embodiment. FIG. 3e is a cross sectional side view that illustrates the heterostructure 208 in more detail, and shows some of the multiple layers of the heterostructure 208 according to one embodiment. As discussed above with respect to FIG. 2, the heterostructure 208 may comprise a plurality of alternating thin layers of materials: a layer comprising a first material or set of materials alternating with a layer comprising a second material or set of materials. FIG. 3e illustrates a first layer type 302 comprising a first material or set of materials alternating with a second layer type 304 comprising a second material or set of materials. In an embodiment, each instance of the first layer type 302 is substantially the same as the other instances of the first layer type 302. Similarly, in an embodiment, each instance of the second layer type 304 may be substantially the same as the other instances of the second layer type 304. While FIG. 3e illustrates four layers of the first layer type 302 alternating with four layers of the second layer type 304, other embodiments may have fewer or more layers. For example, the heterostructure 208 may have as few as two layers, one of the first layer type 302 and one of the second layer type 304, or may have twenty to fifty layers, or even more.

In an embodiment, each layer in the heterostructure 208 may be thin. In an embodiment, each layer may have a thickness on the order of about 1 nanometer. In some embodiments, the layers may have thicknesses between about 0.5 nanometers and about 3 nanometers, although other thicknesses may be used. Thus, in an embodiment that includes about twenty-five of each of the types of layers 302, 304, the heterostructure 208 may have a thickness of about 50 nanometers to about 100 nanometers, although heterostructures 208 in other embodiments may have different thicknesses, based on the number of layers and thickness of each layer.

In an embodiment, the first layer type 302 may comprise silicon and germanium and the second layer type 304 may comprise silicon. In another embodiment, the first layer type 302 may comprise gallium and arsenic and the second layer type 304 may comprise aluminum, oxygen, gallium, and arsenic. In other embodiments, the first and second layer types 302, 304 may comprise other materials.

Figure 3F:
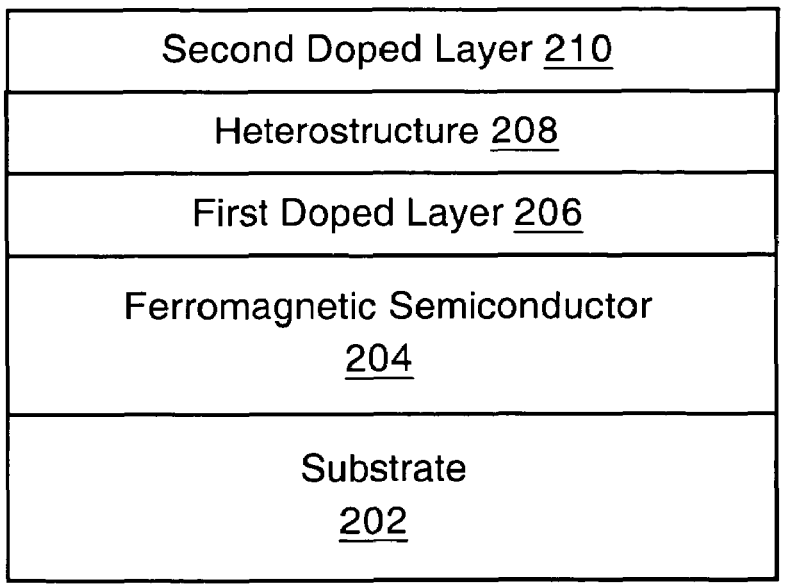

FIG. 3f is a cross sectional side view that illustrates the second doped layer 210 formed on the heterostructure 208, according to one embodiment. In some embodiments, the second doped layer 210 may have a doping type opposite to that of the first doped layer 206. For example, in an embodiment where the first doped layer 206 is p-doped, the second doped layer 210 may be n-doped. In some embodiments, the second doped layer 210 may have a thickness between about 50 nanometers and about 300 nanometers. In an embodiment, the second doped layer 210 may have a thickness between about 50 nanometers and about 150 nanometers. In an embodiment, the second doped layer 210 may have a thickness between about 50 nanometers and about 100 nanometers. In other embodiments, the second doped layer 210 may have a different thickness.

In an embodiment where the ferromagnetic semiconductor layer 204 comprises MnSiGe and the first doped layer 206 comprises SiGe, the second doped layer 210 may comprise silicon with n-type doping. Similarly, in an embodiment where the ferromagnetic semiconductor layer 204 comprises MnGaAs and the first doped layer 206 comprises AlGaAs, the second doped layer 210 may comprise aluminum, gallium and arsenic, with n-type doping. In one embodiment, the second doped layer 210 may comprise $Al_{0.3}Ga_{0.7}As$. In another embodiment the second doped layer 210 may comprise $Si_{0.6}Ge_{0.4}$. In yet another embodiment, the second doped layer 210 may be doped with phosphorus. In other embodiments, the second doped layer 210 may comprise different materials and be doped differently.

Figure 3G:
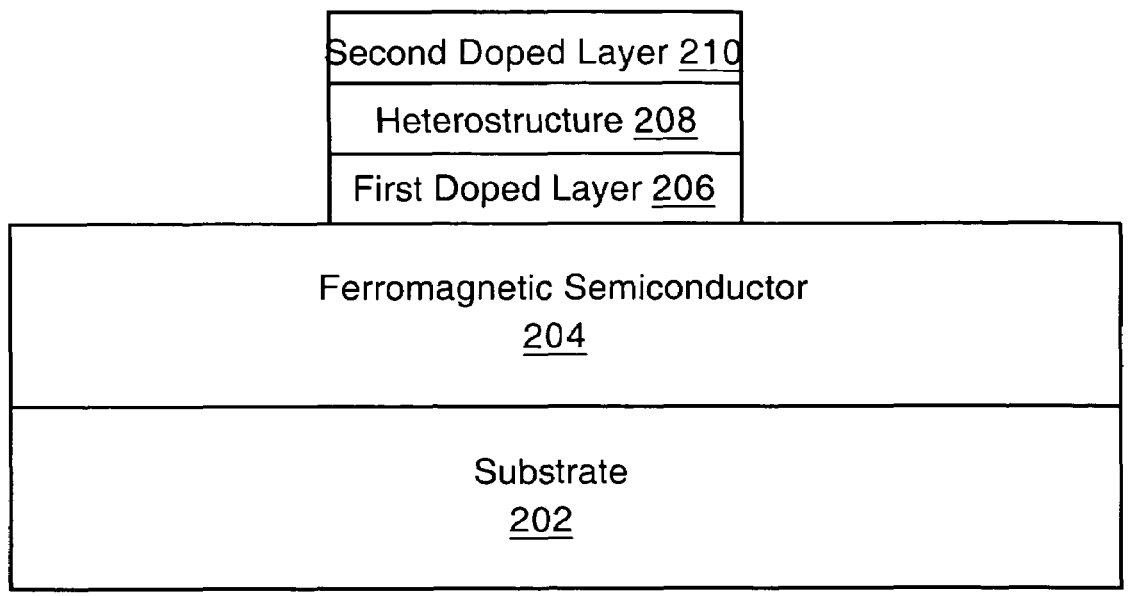

FIG. 3g is a cross sectional side view that illustrates the first and second doped layers 206, 210 and the heterostructure 208 after removal of portions of them to provide a first doped layer 206 with a desired width, a heterostructure 208 with a desired width, and a second doped layer 210 with a desired width. The desired widths for the first doped layer 206, the heterostructure 208, and the second doped layer 210 may be the same, as illustrated in FIG. 3g, or different layers/structures may have different desired widths. Any suitable patterning process may be used to remove portions of the first and second doped layers 206, 210 and the heterostructure 208 to leave the layers/structures with the desired widths.

Conductive contacts may then be formed. FIG. 2 is a cross sectional side view that illustrates contacts 212, 214, 216 formed according to one embodiment of the present invention. As described above, in the illustrated embodiment, the polarization rotator 200 includes a first contact 212 on the second doped layer 210, a second contact 214 adjacent to a first side of the heterostructure 208 (on the left side of the heterostructure 208 in FIG. 2), and a third contact 216 adjacent a second side of the heterostructure 208 (on the right side of the heterostructure 208 in FIG. 2). In other embodiments, there may be a different number of contacts, and the contacts may be positioned differently. In some embodiments, the width of layers 206, 208 and 210 may be different to define a different distribution of light intensity in the waveguide mode. The contacts 212, 214, 216 may comprise a conductive material such as iron, cobalt, nickel, or another conductive material.

Figure 3H:
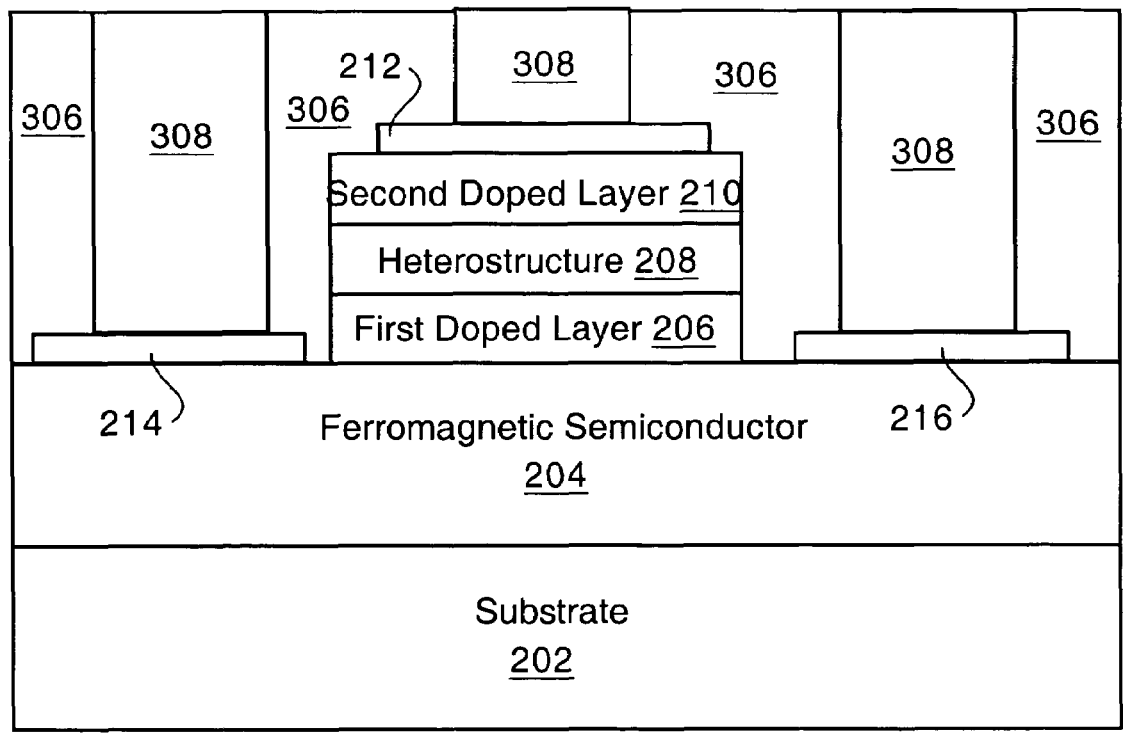

FIG. 3h is a cross sectional side view that illustrates a dielectric layer 306 and conductive vias 308 that have been formed, according to one embodiment. In an embodiment, other devices and/or structures may also be formed on the substrate 202. For example, one or more waveguides may be formed on the substrate 202. In another embodiment, a die, such as a microprocessor may be formed by making devices and/or structures on the substrate 202. Such a die may have a number of interconnect layers that include layers of dielectric material, layers of traces, and vias through the dielectric material. As the dielectric layers, traces, and vias are formed over the devices and/or structures that form the microprocessor, one or more layers of dielectric material 306 may also be formed on the polarization rotator 200. Conductive vias 308 connected to the contacts 212, 214, 216 may be formed through the dielectric material 306 to allow a voltage to be applied across the contacts 212, 214, 216. Thus, the polarization rotator 200 may be integrated on a single substrate with one or more waveguides, passive and/or active devices (including those that form a microprocessor or other microelectronic device on the substrate 202), or other structures.

Figure 4:
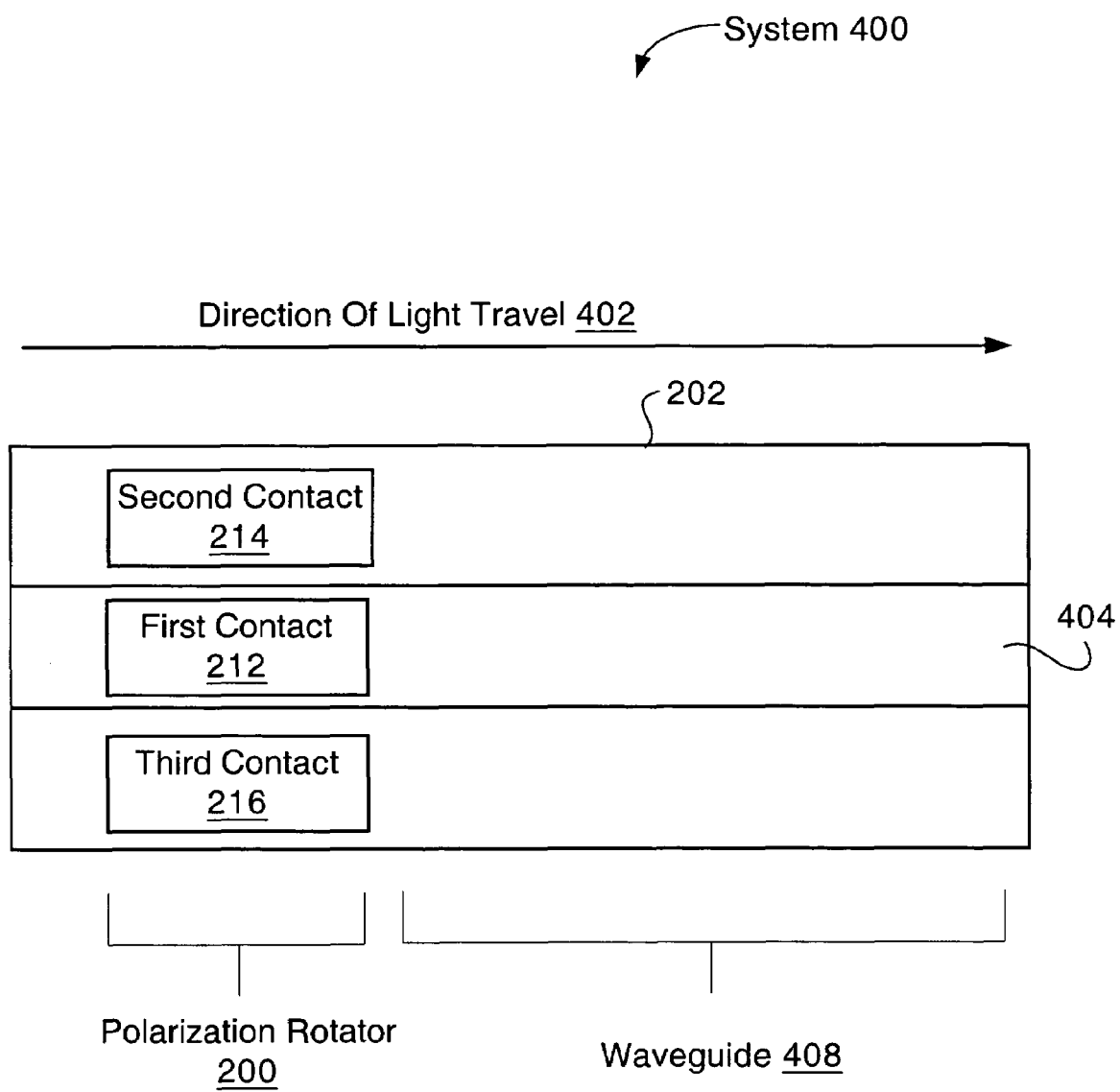
FIG. 4 is a top view that illustrates a system in which the polarization rotator is integrated on a substrate with a waveguide.

FIG. 4 is a top view that illustrates a system 400 in which the polarization rotator 200 is integrated on a substrate 202 with a waveguide 408, according to one embodiment of the present invention. In other embodiments, the polarization rotator 200 and waveguide 406 may be formed separately and connected for use in a non-integrated system.

The system 400 may include a polarization rotator 200 in optical communication with a waveguide 406. Light may travel in a direction 402 through the polarization rotator 200 and then the waveguide 406. The light may have been received by the polarization rotator 402 from a light source (not shown), such as a laser source. The polarization rotator 200 may function to prevent back reflection of the light to the light source. Both the polarization rotator 200 and the waveguide 406 may be formed on the same substrate 202 so that they are integrated (note that the substrate 202 may extend beyond the boundaries illustrated in FIG. 4). Central section 404 of the polarization rotator 200 and the waveguide 406 may include one or more of the first and second doped layers 206, 210, and the heterostructure 208, which may extend above the portions of the polarization rotator 200 and waveguide 406 to either side of the central section 404, as shown in FIG. 2. Other devices and/or structures may also be integrated on the substrate 202.

Figure 5:
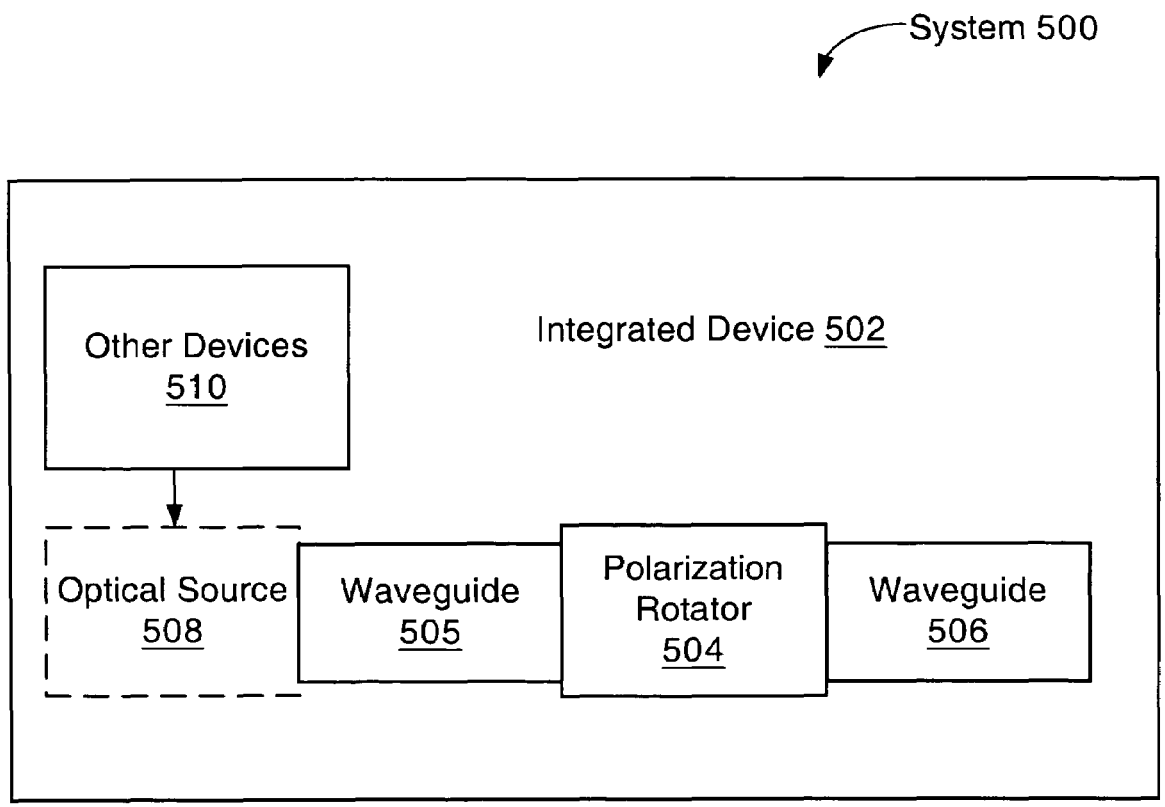
FIG. 5 is a schematic view that illustrates a system in which a polarization rotator and waveguide are part of an integrated device along with other integrated devices and/or structures.

FIG. 5 is a schematic view that illustrates a system 500 in which a polarization rotator 200 and waveguide are part of an integrated device 502 along with other integrated devices and/or structures. The polarization rotator 504 and waveguide 506 may be integrated on a single substrate as described above. Other devices 510, such as a microprocessor, a signal generator, additional waveguides (such as waveguide 505) or another type of device 510 may also be formed on the substrate as part of the integrated device 508. Since the polarization rotator 504 and other devices may be integrated, the total size of the system 500 may be significantly smaller and/or less expensive than possible with prior systems (although some embodiments may be larger than some prior systems, if desired). For example, the integrated device 502 may have a largest dimension smaller than a half-inch in an embodiment, although it may have other sizes in other embodiments.

In operation of one embodiment, the other devices 510 may generate an electrical signal that is to be converted to an optical signal and transmitted. An optical source 508, such as a laser, may be part of the integrated device 502. The optical source 508 is illustrated with dashed lines because the optical source may be a separate component connected to the integrated device 502, or may be integrated on the same substrate (this is not to imply that the other devices 510, polarization rotator 504, or waveguide 506 must be integrated in all embodiments, simply that in the particular illustrated embodiment the other devices 510, polarization rotator 504, and waveguide 506 are integrated while the optical source 508 may or may not be integrated).

In operation of one embodiment, the other devices 510 may generate an electrical signal that is to be converted to an optical signal and transmitted. The optical source 508 may be connected to the other devices 510 to receive the electrical signal and produce an optical signal in response. The optical source 508 may be optically connected to the polarization rotator 504 by waveguide 505 so that the optical signal is sent through the polarization rotator 504. The polarization rotator 504 may rotate the polarization of the light to prevent back reflection and help isolate the optical source 508. The polarization rotator 504 may be optically connected to a waveguide 506 or other transmissive medium, such as an optical fiber, through which the light travels to its destination. The system 500 of FIG. 5 may thus provide an integrated optical transmitter that is smaller and less expensive than non-integrated optical transmitters.

Figure 6:
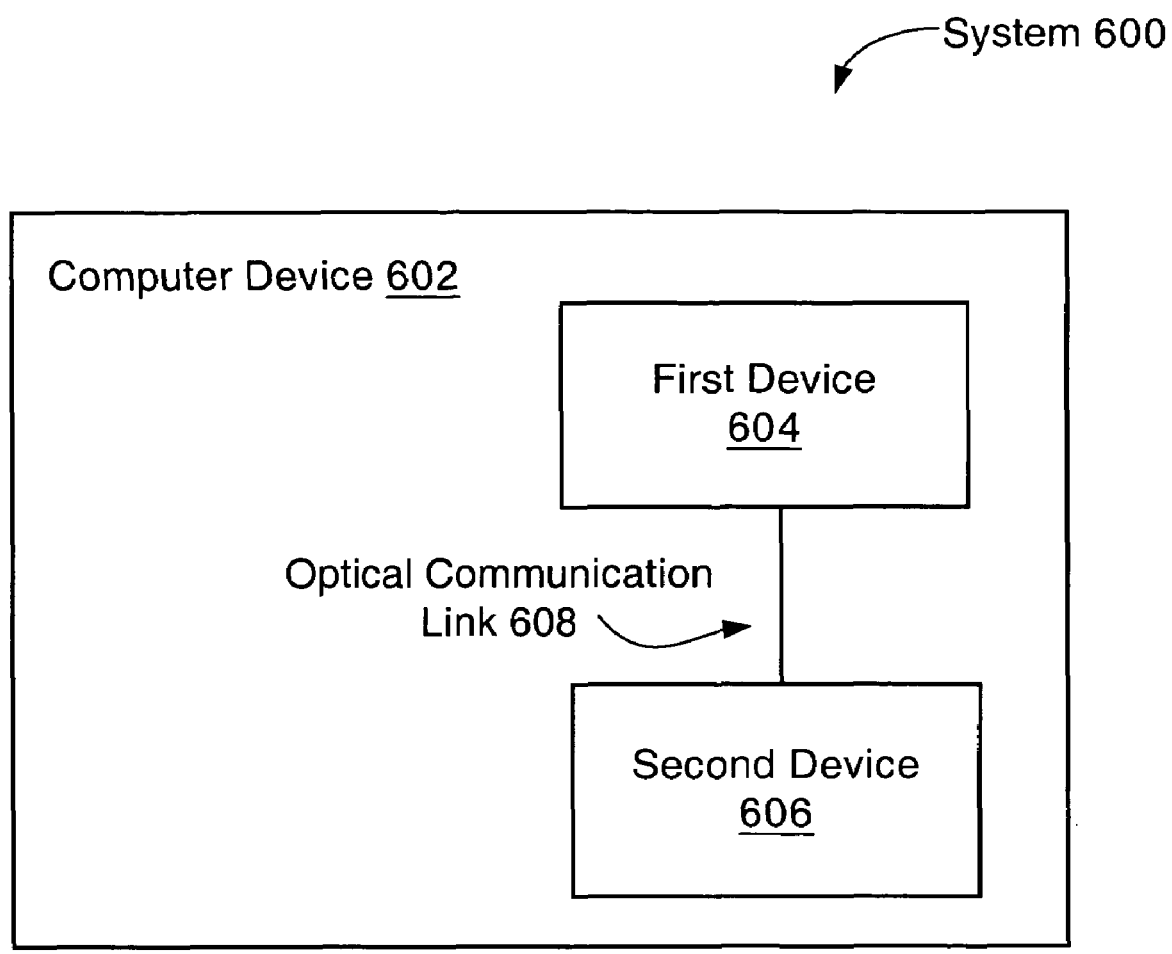
FIG. 6 is a schematic view that illustrates a system in which the system may provide part of an optical link.

FIG. 6 is a schematic view that illustrates a system 600 in which the system 500 of FIG. 5 may provide part of an optical link 608. The system 600 may have a computer device 602 in an embodiment. The computer device 602 may include a first device 604 and a second device 606. There may be an optical communication link 608 between the first and second devices 604, 606. The optical communication link 608 may allow the optical transfer of information between the first and second devices 604, 606 to provide for greater bandwidth than would be available with an electrical communication link. One or both of the first and second devices 604, 606 may include an integrated device 502 such as that described with respect to FIG. 5, with an integrated polarization rotator and waveguide.

For example, in an embodiment, the first device 604 may be a die with a microprocessor integrated on a substrate with a polarization rotator and waveguide. The die of the first device 604 may be attached to substrate, a circuit board such as a printed circuit board, or to another structural element. The second device 606 may also be a die with a microprocessor or other microelectronic device, and may include an optical receiver. The die of the second device 606 may be attached to the same structural element, such as the same printed circuit board, as the die of the first device 604. The optical communication link 608 may include a light transmissive medium through which light can pass between the first and second devices 604, 606, carrying information. The medium may be an optical fiber, air, a vacuum, or another medium. Since the polarization rotator on the first device 604 may be an integrated polarization rotator as described above, it may be small enough to allow optical communication between two dies on the same circuit board in this embodiment.

In another embodiment, the first device 604 may have a die connected to a first circuit board, such as a printed circuit board. The second device 606 may have a die connected to a second circuit board, such as a printed circuit board. In such an embodiment the first circuit board may be, for example, a motherboard. The second circuit board may be, for example, a graphic processing unit expansion board. Since the polarization rotator on the first device 604 may be an integrated polarization rotator as described above, it may be small enough to allow optical communication between two different boards in the same computer device 602, even if the computer device is a small personal computer device. Other embodiments with different types of first and second devices 604, 606 may easily be envisioned.

Figure 7:
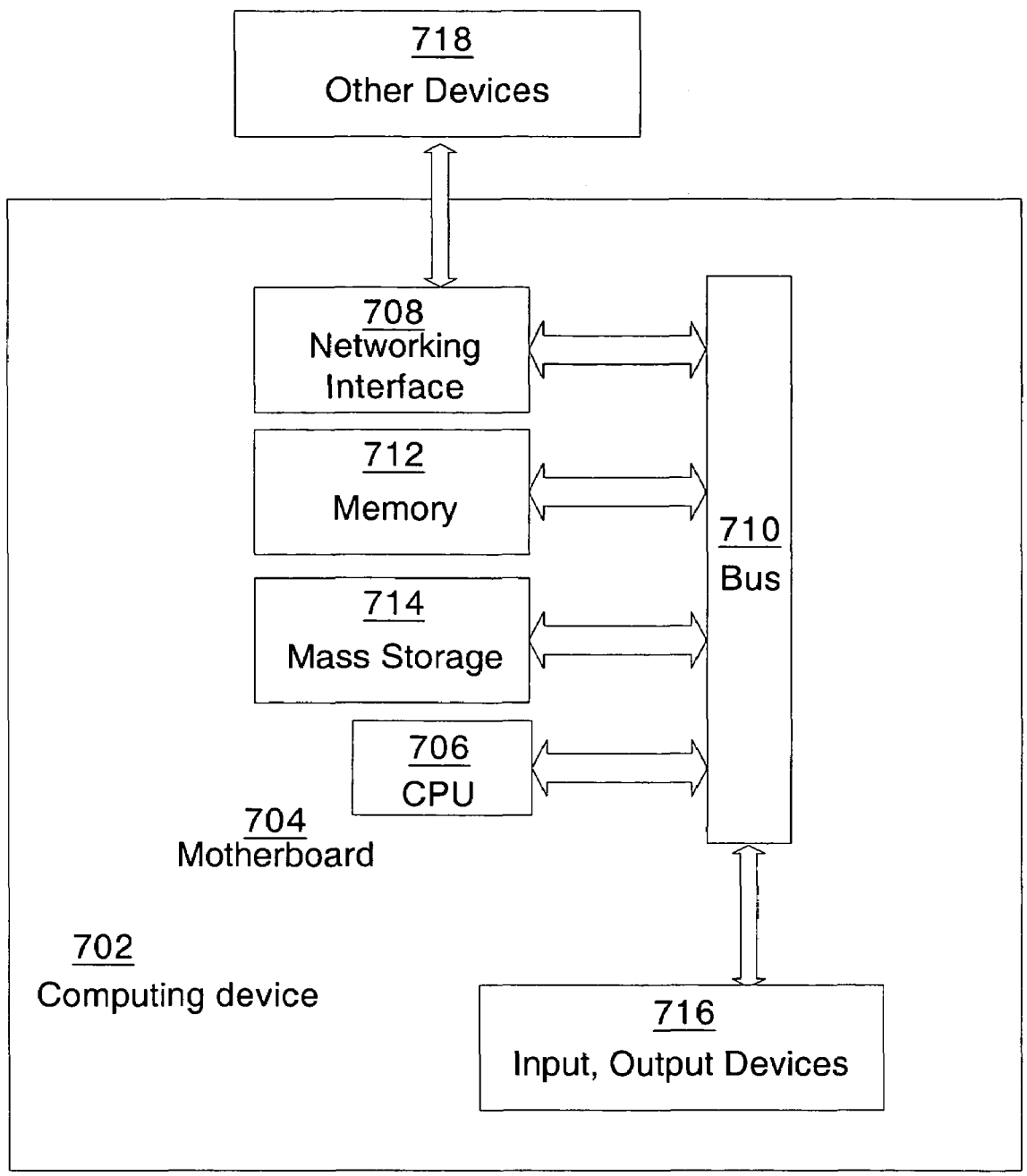
FIG. 7 illustrates a system in accordance with one embodiment of the present invention.

FIG. 7 illustrates a system 700 in accordance with one embodiment of the present invention. The polarization rotator 200 described above may be included in the system 700 of FIG. 7 to help provide optical communication between components of the system 700. As illustrated, for the embodiment, system 700 includes a computing device 702 for processing data. Computing device 702 may include a motherboard 704. Motherboard 704 may include in particular a processor 706, and a networking interface 708 coupled to a bus 710.

Depending on the applications, system 700 may include other components, including but are not limited to volatile and non-volatile memory 712 such as, a graphics processor, a digital signal processor, a crypto processor, a chipset, mass storage 714 (such as hard disk, compact disk (CD), digital versatile disk (DVD) and so forth), input and/or output devices 716, and so forth.

In various embodiments, system 700 may be a personal digital assistant (PDA), a mobile phone, a tablet computing device, a laptop computing device, a desktop computing device, a set-top box, an entertainment control unit, a digital camera, a digital video recorder, a CD player, a DVD player, or other digital device of the like.

Any of one or more of the communication links, illustrated by the arrows in FIG. 7, as well as the bus 710 may be or include an optical communication link that uses the polarization rotator 200 described herein. Similarly, an individual component, such as the CPU 706, may have one or more optical communication links connecting multiple parts of that component that include the polarization rotator 200 described herein. Since an integrated polarization rotator may be smaller and less expensive to make than non-integrated polarization rotator, optical communication links may be included in more and smaller devices than previously.

The foregoing description of the embodiments of the invention has been presented for the purposes of illustration and description. It is not intended to be exhaustive or to limit the invention to the precise forms disclosed. This description and the claims following include terms, such as left, right, top, bottom, over, under, upper, lower, first, second, etc. that are used for descriptive purposes only and are not to be construed as limiting. The term "on" as used herein (including in the claims) does not indicate that a first layer "on" a second layer is directly on and in contact with the second layer unless such is specifically stated; there may be a third layer or other structure between the first layer and the second layer on the first layer. The embodiments of a device or article described herein can be manufactured, used, or shipped in a number of positions and orientations. Persons skilled in the relevant art can appreciate that many modifications and variations are possible in light of the above teaching. Persons skilled in the art will recognize various equivalent combinations and substitutions for various components shown in the Figures. It is therefore intended that the scope of the invention be limited not by this detailed description, but rather by the claims appended hereto.

We claim:

1. A device, comprising:
   a substrate;
   a ferromagnetic semiconductor layer on the substrate;
   a first doped layer on the ferromagnetic semiconductor layer;
   a second doped layer on the first doped layer;
   a multilayer heterostructure between the first and second doped layers, wherein the first and second doped layers and the heterostructure comprise a vertical structure;
   a first contact on the second doped layer and a second contact on the ferromagnetic semiconductor layer, the second contact being adjacent a first side of the vertical structure; and
   a third contact on the ferromagnetic layer, the third contact being adjacent a second side of the vertical structure.

2. The device of claim 1, wherein:
   the ferromagnetic semiconductor layer, the first and second doped layers, and the contacts are part of a polarization rotator
   the device further comprises a waveguide optically connected to the polarization rotator; and
   the polarization rotator and the waveguide are both integrated on the substrate.

3. The device of claim 2 wherein the substrate, the polarization rotator and waveguide are part of a first component, and further comprising:
   an optical source optically coupled to the polarization rotator;
   a second component including an optical receiver; and
   an optical link optically connecting the waveguide to the optical receiver.

4. The device of claim 2, wherein the ferromagnetic semiconductor layer comprises manganese, gallium, and arsenic, and the first doped layer comprises aluminum, gallium, and arsenic.

5. The device of claim 4, further comprising a multilayer heterostructure between the first and second doped layers and wherein the heterostructure includes layers that comprise aluminum, gallium, and arsenic alternating with layers that comprise gallium and arsenic.

6. The device of claim 2, wherein the ferromagnetic semiconductor layer comprises manganese, silicon, and germanium, and the first doped layer comprises silicon and germanium.

7. The device of claim 6, further comprising a multilayer heterostructure between the first and second doped layers and wherein the heterostructure includes layers that comprise silicon and germanium alternating with layers that comprise silicon.

8. A device, comprising:
   a substrate;
   a ferromagnetic semiconductor layer on the substrate, wherein the ferromagnetic semiconductor layer comprises manganese, gallium, and arsenic;
   a first doped layer on the ferromagnetic semiconductor layer, wherein the first doped layer comprises aluminum, gallium, and arsenic; and
   a second doped layer on the first doped layer.

9. The device of claim 8, further comprising a multilayer heterostructure between the first and second doped layers and wherein the multilayer heterostructure includes layers that comprise aluminum, gallium, and arsenic alternating with layers that comprise gallium and arsenic.

10. A device, comprising:
    a substrate;
    a ferromagnetic semiconductor layer on the substrate, wherein the ferromagnetic semiconductor layer comprises manganese, silicon, and germanium;
    a first doped layer on the ferromagnetic semiconductor layer, wherein the first doped layer comprises silicon and germanium; and
    a second doped layer on the first doped layer.

11. The device of claim 10, further comprising a multilayer heterostructure between the first and second doped layers and wherein the multilayer heterostructure includes layers that comprise silicon and germanium alternating with layers that comprise silicon.

* * * * *